United States Patent
Yates et al.

Patent Number: 5,521,244
Date of Patent: May 28, 1996

[54] POLYPHENYLENE ETHER ALLOYS

[75] Inventors: John B. Yates, Glenmont; Alexandros Hasson, Feura Bush, both of N.Y.

[73] Assignee: General Electric Company, Pittsfield, Mass.

[21] Appl. No.: 368,166

[22] Filed: Dec. 30, 1994

Related U.S. Application Data

[62] Division of Ser. No. 33,453, Mar. 18, 1993, Pat. No. 5,399,610, which is a continuation of Ser. No. 816,430, Dec. 31, 1991, abandoned.

[51] Int. Cl.$^6$ .................... C08L 71/12; C08L 79/02; C08F 283/08
[52] U.S. Cl. .................. 524/490; 524/491; 524/474; 524/476; 524/227; 525/391; 525/392; 525/396; 525/397
[58] Field of Search .................... 524/490, 491, 524/474, 476, 227; 525/391, 392, 396, 397, 905

[56] References Cited

U.S. PATENT DOCUMENTS

| | | | |
|---|---|---|---|
| Re. 34,364 | 8/1993 | Brown | 529/390 |
| 4,315,086 | 2/1982 | Ueno et al. | 525/391 |
| 4,782,108 | 11/1988 | Yano et al. | 524/490 |
| 4,814,393 | 3/1989 | Ishihara | 525/391 |
| 4,870,123 | 9/1989 | Nelson | 524/490 |
| 5,008,315 | 4/1991 | Nelson | 524/476 |
| 5,084,511 | 1/1992 | Abe et al. | 525/68 |
| 5,212,255 | 5/1993 | Khouri et al. | 525/391 |
| 5,214,099 | 5/1993 | Khouri et al. | 525/149 |
| 5,281,667 | 1/1994 | Khouri et al. | 525/149 |
| 5,338,796 | 8/1994 | Vianello et al. | 525/66 |

FOREIGN PATENT DOCUMENTS

| | | |
|---|---|---|
| 0451563A2 | 3/1991 | European Pat. Off. |
| 60-99162 | 6/1985 | Japan. |

*Primary Examiner*—Paul R. Michl
*Assistant Examiner*—Olga Asinovsky

[57] ABSTRACT

The present invention relates to a readily molded engineering plastic composition comprising:

polyphenylene ether polymer; optionally a second polymer chosen from polyesters, polyamides and polycarbonates; and about 0.05 to about 5 weight percent hydrogenated poly (alpha-olefin) fluid.

16 Claims, No Drawings

POLYPHENYLENE ETHER ALLOYS

This is a divisional of co-pending application Ser. No. 08/033,453 filed on Mar. 18, 1993, now U.S. Pat. No. 5,399,610; which is a continuation of Ser. No. 07/816,430, filed Dec. 31, 1991, now abandoned.

BACKGROUND OF THE INVENTION

Polyphenylene ethers are a widely used class of thermoplastic engineering resins characterized by excellent hydrolyric stability, dimensional stability, toughness, heat resistance and electric properties. These polyphenylene ethers can be capped with functionalities as for example epoxy triazine, phosphate triazine or ortho ester triazine. These capped or functionalized polyphenylene ethers result in products having higher workability, solvent resistance and additional benefits. These capped polyphenylene ethers can be blended with modifying materials such as polyesters and polyamides to further improve characteristics of the resulting polymer alloys over state of the art polymer alloys or blends. PCT published application 87–850 describes blends of polyphenylene ether resins and polyesters and discloses that polyesters such as polyalkalene dicarboxylates (particularly polyalkylene terephthalates) can be added to polyphenylene ether resins in order to provide an improved material which is resistant to nonpolar solvents such as gasoline.

One problem in commercially providing such satisfactory blend compositions of polyphenylene ether with polyalkylene terephthalates is that the polyalkylene terephthalates undergo a degree of degradation during processing which is caused by the fact that the typical processing temperatures of polyphenylene ether polymers exceed the thermal decomposition temperatures for many polyalkylene terephthalate polymers. As a result, an unacceptably narrow processing temperature band for many alloys limits the utility of the alloys in many injection molding applications.

Therefore, a need exists for providing blends of polyphenylene ethers with other polymers such as polyalkylene dicarboxylates and other polyphenylene ether-containing alloys which can be worked at lower processing temperatures and injection molded at lower temperatures lower than state of the art compositions which employ polyphenylene ether polymers.

U.S. Pat. No. 4,626,566 issued to Kenneth F. Miller et al. teaches the use of hydrogenated poly (alpha-olefin) fluids as mold release agents with aromatic carbonate polymers. U.S. Pat. No. 4,870,124 issued to Nelson teaches the use of hydrogenated polymers and oligomers of poly (alpha-olefin) as mold release agents for thermoplastic compositions. Neither of these references teach the use of hydrogenated poly (alpha-olefin) fluids to improve the workability and flowability of polymer alloy compositions comprised of capped or functionalized polyphenylene ether blends and alloys.

SUMMARY OF THE INVENTION

It is an object of this invention to provide novel polyphenylene ether materials which have enhanced impact resistance and improved processing characteristics. It is still another object of this invention to provide lower working molding methods to be used with a material in accordance with the preceding object.

The present invention relates to thermoplastic compositions comprising: polyphenylene ether polymer which is preferably capped; a second polymer chosen from the group of polymers consisting of polyester polymers, polyamide polymers, polycarbonate polymers and mixtures thereof; and hydrogenated poly (alpha-olefin) polymers.

The thermoplastic compositions of this invention may be readily injection molded to provide shaped articles with enhanced impact resistance over state-of-the-art polyphenylene ether thermoplastic compositions. Furthermore, these thermoplastic compositions have improved processing characteristics relative to state of the art thermoplastic compositions of polyphenylene ether and polyalkalene terephthalate. The articles produced using the present invention have enhanced impact characteristics vis-a-vis state of the art compositions comprising polyphenylene ether polymers and can be molded or worked at lower working or molding temperatures because of the use of poly (alpha-olefin) polymers.

DETAILED DESCRIPTION OF THE INVENTION

The present invention relates to thermoplastic compositions comprising: functionalized polyphenylene ether polymer which is preferably capped; a second polymer chosen from the group of polymers consisting of polyester polymers polyamide polymers, polycarbonate polymers, and mixtures thereof; and hydrogenated poly (alpha-olefin) polymers.

Polyphenylene ether resins are well-known in the art and are generally of the formula

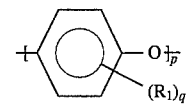

wherein each $R_1$ is individually selected from the group consisting of halogen, alkyl, aryl and alkoxy, q is from 0 to 4 and p is on the average at least 20. When $R_1$ comprises an alkyl group, aryl group or an alkoxy group, the group suitably contains from about 1 to about 12 carbon atoms.

The polyphenylene ether polymers suitable for use in the present invention are well known in the art and may be prepared by any of a number of processes known in the art from corresponding phenols or reactive derivatives thereof. Examples of polyphenylene ether resins and methods for their production are set forth in the Hay U.S. Pat. Nos. 3,306,874 and 3,306,875 (Hay), in U.S. Pat. Nos. 3,257,357 and 3,257,358 (Stamatoff), and in U.S. Pat. No. 4,935,472 (S. B. Brown et al.), all of which are incorporated herein by reference.

Throughout the specification and claims the term "polyphenylene ether resin" includes unsubstituted polyphenylene ether polymers, substituted polyphenylene ether polymers (wherein the aromatic ring is substituted), polyphenylene ether copolymers and blends thereof.

Polyphenylene ether polymers useful in the present invention include, but are not limited to,
poly(2,6-dimethyl-1,4-phenylene) ether;
poly(2,3,6-trimethyl-1,4-phenylene) ether;
poly(2,6-diethyl-1,4-phenylene) ether;
poly(2-methyl-6-propyl-1,4-phenylene) ether;
poly(2,6-diprophyl-1,4-phenylene) ether;poly(2-ethyl-6-propyl-1,4-phenylene) ether;
poly(2,6-dilauryl-1,4-phenylene) ether; poly (2,6-diphenyl-1,4-phenylene) ether;
poly(2,6-dimethoxy-1,4phenylene) ether;
poly(2,6-diethoxy-1,4-phenylene) ether;
poly(2-methoxy-6-ethoxy-1,4-phenylene) ether;

poly(2-ethyl-6-stearyloxy-1,4-phenylene) ether;
poly(2,6-dichloro-1,4-phenylene) ether;poly(2-methyl-6-phenyl-1,4-phenylene ether;
poly(2,6-dibenzyl-1,4-phenylene ether;
poly(2-ethoxy-1,4-phenylene)ether; poly(2-chloro-1,4-phenylene) ether; poly(2,6-dibromo-1,4-phenylene) ether;
poly(3-bromo-2,6-dimethyl-1,4-phenylene) ether, copolymers thereof and mixtures thereof, and the like.

Particularly preferred polyphenylene ethers polymers for use in the compositions of the present invention include poly(2,6-dimethyl-1,4-phenylene) ether, poly(2,3,6-trimethyl-1,4-phenylene) ether, blends of these polymers and copolymers including units of 2,3,6-trimethyl-1,4-phenylene ether and units of 2,6-dimethyl-1,4-phenylene ether. Examples of such polymers and copolymers are also set forth in U.S. Pat. No. 4,806,297.

When polyphenylene ether is used without first capping, it is preferred that they be used in amounts of 95 to 5 percent by weight admixed with 5 to 95 percent by weight of a polycarbonate. Suitable polycarbonates include, bisphenol A polycarbonate. In preferred embodiments the polycarbonate is from about 1 to about 35 percent by weight of the mixture, such polycarbonates include the known polycarbonates prepared from bisphenol A (4,4-dihydroxy-diphenyl-2,2 propane). Other useful polycarbonates including copolycarbonates as described in U.S. Pat. No. 4,806,297 which is incorporated by reference herein, see particularly columns 9 and 10 of the specification therein.

In preferred embodiments, the present invention, the polyphenylene ether polymer is functionalized or "capped" with endgroups which add further reactivities to the polymer and in some instances provide additional compatibility with other polymer systems which may be used in conjunction with the polyphenylene ether polymer to produce an alloy or blend. For instance, the polyphenylene ether may be functionalized with an epoxy endgroup in the manner set forth in co-assigned U.S. patent application Ser. Nos. 07/351,903, filed May 15, 1989, entitled COMPOSITIONS COMPRISING POLYPHENYLENE ETHER-POLYESTER COPOLYMERS FROM EPOXYTRIAZINE-CAPPED POLYPHENYLENE ETHERS, Brown, et. al, and Ser. No. 07/351,905, filed May 15, 1989, entitled EPOXYTRIAZINE-CAPPED POLYPHENYLENE ETHERS AND METHOD OF PREPARATION, Brown et. al., both of which are incorporated herein by reference. These epoxy functionalized polyphenylene ether polymers have endgroups of the general formula

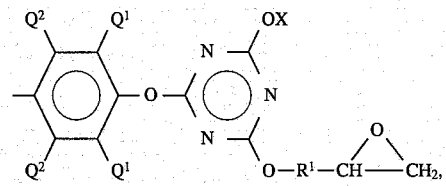

wherein:

each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy, wherein at least two carbon atoms separate the halogen and oxygen atoms;

each $Q^2$ is independently hydrogen, halogen, primary or secondary lower alkyl, phenyl, haloalkyl, hydrocarbonoxy or halohydrocarbonoxy as defined for $Q^1$;

X is an alkyl, cycloalkyl or aromatic radical or

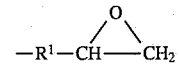

$R^1$ is a divalent aliphatic, alicyclic, heterocyclic or unsubstituted or substituted aromatic hydrocarbon radical.

The epoxy functionalized polyphenylene ether polymers are functionalized or "capped" with an epoxy triazine compound suitable for use in preparing these functionalized polyphenylene ether polymers and are disclosed in U.S. Pat. No. 4,895,945 issued to Brown, which is also incorporated herein by reference.

A second class of preferred functionalized polyphenylene ether polymers comprise phosphate functionalized polyphenylene ether polymers. These phosphate functionalized polyphenylene ethers are disclosed in commonly assigned U.S. patent application Ser. Nos. 07/654,444, filed Feb. 11, 1991, entitled SUBSTITUTED CHLOROTRIAZINES USEFUL FOR REACTIVE CAPPING OF POLYPHENYLENE ETHERS, Phanstiel, et. al., 07/654,443, filed Feb. 11, 1991, entitled COPOLYMER CONTAINING COMPOSITIONS FROM SUBSTITUTED TRIAZINE-CAPPED POLYPHENYLENE ETHERS, Phanstiel, et. al., and 07/653,586, filed Feb. 11, 1991, entitled SUBSTITUTED TRIAZINE-CAPPED POLYPHENYLENE ETHERS, Phanstiel, et. al, all of which are incorporated herein by reference.

These phosphate functionalized polyphenylene ethers are prepared from a phosphate substituted triazine compound. Typical phosphate triazines include:
2-chloro-4(2-diethylphosphatoethoxy)-6-(2,4,6-trimethylphenoxy)-1,3,5-triazine;
2-chloro-4-(2-dibutylphosphatoethoxy)-6(2,4,6-trimethylphenoxy)-1,3,5-triazine; and
2-chloro-4-)2-dibutylphosphatoethoxy)-6-(2,6-dimethylphenoxy)-1,3,5-triazine.

A third preferred class of functionalized or capped polyphenylene ether polymers useful in the present invention is the ortho ester functionalized polyphenylene ether polymers which use ortho-ester substituted triazine compounds as described in commonly assigned copending application Ser. Nos. 07/566,025, filed Aug. 13, 1990, entitled ORTHO ESTER-CAPPED POLYPHENYLENE ETHERS & COPOLYMERS PREPARED THEREFROM, Khouri, et. al., and 07/623,838, filed Dec. 7, 1990, entitled SUBSTANTIALLY PURE HYDROXYALKYL-SUBSTITUTED CYCLICORTHO ESTERS & METHOD FOR THEIR PREPARATION, Khouri.

Furthermore, the polyphenylene ether polymer included in the thermoplastic compositions of the present invention may comprise one or more functionalized or non-functionalized polyphenylene ether polymers and/or copolymers or mixtures thereof.

Polyphenylene ethers useful in the present invention generally have a number of average molecular weights within the range of about 3,000 to 40,000 and a weight average molecular weight within the range of about 20,000 to 80,000 as determined by gel permeation chromatography. The polymers' intrinsic viscosity is most often in the range of about 0.15 to 0.65 dl./g. as measured in chloroform at 25° C.

The second component in the present invention comprises a polymer which is selected from a group of polymers consisting of polyesters, polyamides, polycarbonates and mixtures thereof.

Polyesters useful in the present invention include thermoplastic polyesters illustrated by poly(alkylene dicarboxylates), elastomeric polyesters, polyarylates and polyester copolymers such as co-polyester carbonates. Because it is thought that the principal reaction which occurs with the epoxy endgroups in the preferred capped polyphenylene ethers polymers involves a carboxylic acid group of the polyester, it is highly preferred that the said polyesters have relatively high carboxylic endgroup concentration. Concentrations in the range of 5–250 microequivalents per gram are generally preferred.

The most preferred polyester polymers are the poly(alkylene dicarboxylates) which specifically include the dialkylene terephthalates (specifically polybutylene terephthalates and polyethylene terephthalates).

The preferred polyesters generally have are intrinsic viscosity of 0.50 to 1.30 at 30° centigrade in a mixture of 60 wt. % phenol and 40 wt. % 1,1,2,2-tetrachloroethane.

The polyalkylene terephthalates polymers useful in the present invention are known in the art. Examples of these polymers are disclosed in U.S. Pat. Nos. 4,902,753; 4,128,526, 3,953,394; 3,672,487; 3,047,539; 2,822,348; 2,727,881; 2,720,502; and 2,465,319.

The polyamides useful in the present invention are well-known in the art. Specific examples of polyamides are polyamide-6, polyamide-6,6, polyamide-11, polyamide-12, polyamide-6,3, polyamide-6,4, polyamide-6,10 and polyamide-6,12, as well as polyamides prepared from terephthalic acid and/or isophthalic acid and trimethylhexamethylenediamine; from adipic acid and m-xylylenediamines; from adipic acid, azelaic acid 2,2-bis-(p-aminocyclohexyl) propane, and from terephthalic acid and 4,4'-diaminodicyclohexylmethane. Mixtures and/or copolymers of two or more of the foregoing polyamides or prepolymers thereof, respectively, are also within the scope of the present invention.

Furthermore, the polyamides may be made by any known method, including the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above, together with substantially equimolar proportions of a diamine and a dicarboxylic acid. The dicarboxylic acid may be used in the form of a functional derivative thereof, for example, an ester or acid chloride. A detailed description of polyamides and polyamide presursor materials is provided in U.S. Pat. 4,755,566 (Yates). Other useful polyamides (often referred to as "Nylons") are disclosed in U.S. Pat. Nos. 4,732,938 (Grant et al.) 4,659,760 (Van der Meet), and 4,315,086 (Ueno et al.), each also incorporated herein by reference.

The polyamide used may also be one or more of those referred to as "toughened nylons", which are often prepared by blending one or more polyamides with one or more polymeric or copolymeric elastomeric toughening agents. Examples of these types of materials are given in U.S. Pat. Nos. 4,174,358; 4,474,927; 4,346,194; 4,251,644; 3,884,882; 4,147,740; all incorporated herein by reference, as well as in a publication by Gallucci et al, "Preparation and Reactions of Epoxy-Modified Polyethylene", J.APPL.POLY.SCI., V.27, PP, 425–437 (1982).

The preferred polyamides for this invention are polyamide-6; 6,6; 11 and 12, with the most preferred being polyamide-6,6.

The third component of the present invention are hydrogenated (alpha-olefin) polymers which are derived from the polymerization of 1-olefin by catalytic reaction followed by hydrogenation to remove residual unsaturation. Examples of such catalysis includes cationic catalysis and metathesis catalysis Methods of preparing the hydrogenated alpha-olefin polymers is in liquid form are disclosed in U.S. Pat. Nos. 4,282,392; 4,225,739; 4,319,065; 4,311,864; 4,334,113; and 4,409,415 which are incorporated by reference herein. Such polymers or materials are referred to in the art as fluids and comprise various molecular weights including oligomers.

Preferred saturated alpha olefin fluids used in the present invention are those with kinematic viscosity of approximately 2 to about 20 centistokes and preferably 8 to 12 centistokes at 100° C. as determined by ASTM D445. Such fluids are commercially available from Emery Industries and are known as Emery 3002, Emery 3004, Emery 3006, etc. Alternately, the synfluids manufactured by Gulf Oil Corporation are useful, as well as Quantum Chemicals' poly (alpha-olefin) 3002; poly (alpha-olefin) 3004; poly (alpha-olefin) 3006; poly (alpha-olefin) 3008; and poly (alpha-olefin) 3010.

In practice of the present invention the weight ratio of polyphenylene ether to polyester, polyamide, polycarbonate or mixtures thereof, may vary from about 5 to about 95 weight percent polyphenylene ether and from about 95 to about 5 weight other polymer based on the total weight of the resin composition. The hydrogenated alpha olefin fluid comprises from approximately 0.05 to about 5 weight percent of the composition.

In the embodiments of the present invention employing polyphenylene ether and polyamide, the weight ratio of polyphenylene ether to polyamide may vary from about 5 to 95 to about 95 to 5. In these compositions the hydrogenated (alpha-olefin) fluid should be within the range of approximately 0.05 to about 5 weight percent of the total composition and preferably 0.1 to 2 weight percent. More preferably, the compositions comprise from about 15 to about 75 weight percent polyphenylene ether polymer and from about 85 to about 25 weight percent polyalkylene terephthalate polymer or other polymer.

Various impact modifiers are known in the art suitable for use in the compositions of the present invention. The preferred embodiment of the impact modifier comprises a vinyl aromatic polymer of one or more of the types described herein. In one embodiment the impact modifier may comprise a rubber, a natural or synthetic elastomer such as EPDM rubber or polybutylacrylate, a diene rubber, for instance, polybutadiene, isoprene, or the like. Typically impact modifiers may comprise approximately 1 to about 30 weight percent of the total composition.

Alternately, the composition of the present invention might include a vinyl aromatic polymer as an impact modifier. These vinyl aromatic polymers include unsubstituted polystyrene, substituted polystyrene and polystyrene copolymer resins. Suitable polystyrene resins include polystyrene polymers including atactic styrene, halogenated styrenes, poly-alpha-methylstyrenes, poy-para-methylstyrenes, styrene-acrylonitrile styrenes, styrene maleic anhydride styrenes, styrene butadiene copolymers, rubber modified polystyrenes and mixtures thereof.

Various embodiments of the present invention may include as vinyl aromatic polymer a rubber modified polystyrene polymer conventionally known in the art as HIPS (high impact polystyrene). The rubber modified polystyrene may be formed by additional rubber to preform the polystyrene or by addition of the rubber to styrene monomer which is polymerized in the presence of the rubber. Those methods are known in the art and may be employed in producing a rubber modified polystyrene for use in the present invention an alternative embodiment using vinyl aromatic polymers. The vinyl aromatic polymer comprises a block of polymer of a vinyl aromatic monomer and an alkene hydrocarbon monomer, or a conjugated diene monomer. Various types of block polymers are known. The block polymer may comprise a tapered linear block copolymer comprised of blocks of A and B wherein A is a polymerized vinyl aromatic hydrocarbon block and B is a hydrogenated, partially hydrogenated, or non-hydrogenated block derived from at least one polymerized conjugated diene. Tapered linear block copolymers known in the art are taught for example in U.S. Pat. Nos. 4,948,832, 4,918,145, 4,913,971 and 4,116,917. Commercially available tapered tri-block polymers are available under the trade name Finaclear® 520 from Fina Oil Company.

Another impact modifier is the block copolymer represented by the formula A-B-A wherein the terminal blocks A, which may be the same or different, are thermoplastic homopolymers or copolymers prepared from a vinyl aromatic compound. Examples of the vinyl aromatic compound include, but are not limited to, styrene, alpha-methylstyrene, vinyl toluene, vinyl xylene, ethylvinyl xylene, vinyl naphthalene and the like, or mixtures thereof. The center block B comprises an elastomeric polymer derived from alkene hydrocarbons such as ethylene or butylene, conjugated dienes or the like, or mixtures thereof. The block copolymers may be subjected to a hydrogenation process whereby the unsaturated rubber block portion B of the copolymer is hydrogenated. Hydrogenation may be accomplished using conventional hydrogenation catalysts and reaction conditions. In the hydrogenated block copolymers, the terminal blocks A may have an average number molecular weight of about 4,000 to about 115,000 while the center blocks B have an average molecular weight of from about 20,000 to about 450,000 Hydrogenated block copolymers are specifically described in the Jones U.S. Pat. No. 3,431,323 and the DeLaMare et al U.S. Pat. No. 3,670,054, both of which are incorporated herein by reference. Suitable block copolymers for use in the present invention comprise hydrogenated styrene-butadiene-styrene (styrene-ethylene-butylene-styrene) block copolymers and hydrogenated styrene-isoprene-styrene block copolymers. Block copolymers of this type are commercially available under the tradenames Kratone from Shell Chemical and Septone from Kuraray Co., Ltd.

Another type of impact modifier is the vinyl aromatic polymer comprising a radial block copolymer of a vinyl aromatic monomer and a conjugated diene monomer. These radial block copolymers are also well known in the art. Copolymers of this type generally comprise from about 60 to about 95 percent by weight polymerized vinyl aromatic monomer and about 40 to about 5 percent by weight polymerized conjugated diene monomer. The copolymer has at least three polymer chains which form a radial configuration, and each chain usually terminates with the substantially non-elastomeric segment, to which an elastomeric poymer segment is joined. These block copolymers are also referred to "polymodal branched block copolymers" and "star polymers". Examples of radial block copolymers are set forth in the Kitchen et al U.S. Pat. No. 3,639,517 which is incorporated herein by reference. These block copolymers are commercially available under the tradename K-Resin from Phillips Petroleum.

Alternately, the radial block copolymer of a vinyl aromatic monomer in a conjugated monomer may comprise a radial teleblock copolymer which contains segments or blocks which themselves comprise a conjugated diene polymer, vinyl aromatic polymer blocks, and a coupling agent. These block copolymers are sometimes referred to as "branched" polymers and are set forth in U.S. Pat. No. 4,097,550, which is incorporated herein by reference. The radial teleblock copolymers are prepared by methods known in the art, for example, as disclosed in the Zelinski et al U.S. Pat. No. 3,281,383, incorporated herein by reference. These polymers are also available commercially, for example, as the Finaprene® products, grades 401, 411, 414, 416 and 417, from Fina Oil Company.

When the compositions of the invention include one or more of the vinyl aromatic polymers as discussed above, it is preferred that the vinyl aromatic polymer is included in an amount of from about 1 to about 30 weight percent.

The compositions of the invention may further include one or more conventional additives including, but not limited to, antioxidants fillers, flame retardants, reinforcing agents, nucleating agents and the like. Additionally, the composition may include one or more additional polymer components to further improve one or more of the properties of the compositions. For example, impact strength can be improved for polyphenylene ether and polyalkalene terephthalate polymer mixtures by the addition of impact modifiers.

The compositions according to the present invention may be produced using any method known in the art. For example, the polyphenylene ether polymer and polyalkylene terephthalate polymer may be prepared by melt mixing or compounding the hydrogenated (alpha-olefin) may be added prior to or during the melt compounding step. However, it is preferred that the poly (alpha-olefin) fluid be added before the melt compounding begins, due to the lower processing temperatures required of the present compositions of the invention, the composition may be easily formed into various products and may be injection molded to produce various shaped articles. The physical properties, especially in regard to impact characteristics, are improved over the state of the art compositions which do not employ hydrogenated (alpha-olefin) fluids as lubricants and processing aids.

The example is intended to illustrate the benefits of the present invention but does not exemplify the full scope of the invention.

EXAMPLE

Preparation of Polymer Alloys Exemplification

The Present Invention

Base compositions were made by melt compounding, comprising 30 parts weight of an epoxy functionalized polyphenylene ether, and 60 parts by weight of polybutylene terephthalate available commercially from General Electric Company under the tradename Valox® 315 and 10 parts by weight of an impact modifier sold under the tradename Finaprene 401SBS by Fina Oil. Samples with the * next to them further includes 10 parts by weight Finaclear 520 SBS sold by Fina Oil substituted for 10 parts of the epoxy functionalized polyphenylene ether. All of the compositions further comprise 0.3 parts by weight Irganox® 1010 (antioxidant) sold by Ciba Geigy, 0.3 parts by weight Seenox® 412S (antioxidant) sold by Argus Chemical, and 0.3 parts by weight Ultranox® 626 (antioxidant) sold by General Electric Specialty Chemical. Table 1 indicates the tested compositions. The PAO used in each sample was Quantum® 3004 (4 cSt PAO) and Quantum® 3008 (8 cSt PAO). A Werner Pfleiderer twin screw extruder (30 millimeter) was charged with the components of the composition. The extruder was run at 550° F., 350 RPM and a vacuum (20 inch) applied to the melt. The extruded strands were chopped into standard size injection molding beads and dried to remove water. The beads are molded under normal or abusive conditions as described, into standard test parts. Test procedures were HDT—ASTM D648, Tensile—ASTM D638, Izod D256 impact test and Dynatup D3763. Table 2 indicates physical characterization of the various samples.

TABLE 1

Formulations of Samples

| Sample # | wt. parts 4 cSt PAO | wt. parts 8 cSt PAO |
|---|---|---|
| 1 | 0 | 0 |
| 2 | .5 | 0 |
| 3* | .5 | 0 |
| 4* | 0 | 0 |
| 5 | 0 | 0 |
| 6 | 0 | .2 |
| 7 | 0 | .6 |
| 8* | 0 | .6 |
| 9* | 0 | 0 |

*indicates base composition further comprised 10 parts by weight Finaclear® 520 SBS (styrene-butadiene-styrene)
x indicates weight parts of poly (alpha-olefin) fluid (PAO) with the indicated centistoke (cSt) viscosity.

TABLE 2

| | | notched Izod | | | Dynatup | | | | | | | |
| | | normal | | abusive | | normal | | abusive | | | | | |
| Sample | HDT | 73 | −20 | 73 | −20 | 73 | −20 | 73 | −20 | FM | FS | TY | TE |
|---|---|---|---|---|---|---|---|---|---|---|---|---|---|
| 1 | 326 | 14.4 | 3.8 | 11.9 | 3.3 | 46D | 35B | 43D | 46B | 306 | 11.6 | 7.2 | 61 |
| 2 | 327 | 15.6 | 4.6 | 12.4 | 3.4 | 40D | 42D | 43D | 40D | 293 | 10.8 | 6.9 | 68 |
| 3 | 279 | 18.3 | 4.6 | 16.7 | 3.9 | 36D | 40D | 40D | 42D | 262 | 9.3 | 6.2 | 82 |
| 4 | 277 | 17.5 | 3.3 | 16.0 | 3.4 | 40D | 40D | 42D | 42D | 265 | 9.5 | 6.3 | 82 |
| 5 | 329 | 15.4 | 3.6 | 10.4 | 3.2 | 39D | 38D | 35D | 37B | 264 | 10.1 | 6.6 | 77 |
| 6 | 323 | 16.7 | 4.4 | 12.8 | 3.2 | 41D | 36D | 42D | 42B | 263 | 9.9 | 6.6 | 122 |
| 7 | 322 | 17.5 | 4.8 | 12.7 | 3.4 | 41D | 42D | 40D | 42D | 263 | 9.9 | 6.6 | 97 |
| 8 | 281 | 12.5 | 2.6 | 14.0 | 3.1 | 41D | 32D | 38D | 41D | 240 | 8.7 | 6.0 | 82 |
| 9 | 285 | 15.7 | 4.2 | 11.4 | 3.2 | 40D | 36D | 38D | 39B | 227 | 8.6 | 6.0 | 83 |

HDT (heat distortion temperature) @ 66 psi in °F.; notched Izod in ft-lb/in; dynatup in ft-lb; FM is flexural modulus in Kpsi; FS is flexural strength in Kpsi; TY is tensile yield in Kpsi; TE is tensile elongation @ break in %.
D refers to ductile
B refers to brittle
"normal" refers to samples molded under typical conditions (525° F. barrel set temperatures with a 2 minute residence time)
"abusive" refers to samples under harsher conditions such as 525° F. barrel set temperature for 8 minutes residence time As evidenced by these data, the ductility of the dynatup dart impact is significantly improved by the addition of the poly (alpha-olefin) fluid to certain polyphenylene ether/polybutylene terephthalate alloys. Other physical properties, especially the HDT are not significantly altered. In addition to these data, the torque generated during the extrusion processing of the material is reduced by as much as 20% by the addition of about 0.6 weight percent of the PAO fluid.

Preferably the capped polyphenylene ether polymers are blended or alloyed with polyesters or polyamides as known the art. In some cases such capped polyphenylene ether polymers are admixed with polycarbonate polymers alone or with polyesters or polyamides. When polyphenylene ether polymers are not capped they are preferably admixed or alloyed with polycarbonates although they can be admixed with polyesters or polyamides. In all cases from 0.05 to 5 weight percent of the composition of poly (alpha-olefin) fluid is incorporated in the final composition.

The preceding example is set forth to illustrate specific embodiments of the invention and are not intended to limit the scope of the compositions of the present invention. Additional embodiments and advantages within the scope of the claimed invention will be apparent to one or ordinary skill in the art.

What is claimed is:

1. A moldable thermoplastic polymer composition comprising polyphenylene ether polymer and hydrogenated poly (alpha-olefin fluid) in an amount effective to increase the flow characteristics of said composition, said composition further comprising a polymer material selected from the group consisting of polyamides, polycarbonates and mixtures thereof, wherein said poly (alpha-olefin) fluid is present in an amount of from about 0.05 to about 5.0% by weight based on the weight of the entire composition; wherein said polyphenylene ether polymer is capped with a material selected from the group consisting of epoxy, phosphate and orthoester.

2. The composition of claim 1 wherein said composition comprises between about 15 and about 75 weight percent of the capped polyphenylene ether polymer.

3. The composition of claim 1 wherein said polymeric material is a polyester polymer chosen from the group of polyester polymers consisting of poly(butylene terephthalate) and poly(ethylene terephthalate).

4. The coposition of claim 1 wherein said hydrogenated poly(alpha-olefin) has a kinematic viscosity in the range of about 2 cSt to about 20 cSt at 100° C.

5. The composition of claim 4 wherein said hydrogenated poly(alpha-olefin) comprises 0.1 to 2 weight percent of the composition.

6. The composition of claim 1 wherein said material is epoxy and said polyphenylene ether polymer has endcaps of the general formula

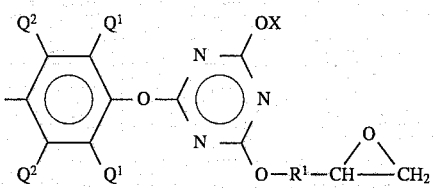

wherein each $Q^1$ is independently halogen, primary or secondary lower alkyl (an alkyl containing 1 to 7 carbon atoms), phenyl, haloalkyl, aminoalkyl hydroxycarbonoxy, or halohydrocarbonoxy wherein at least two carbon atoms separate the halogen and oxygen atoms;

each $Q^2$ is independently hydrogen, halogen, primary or secondary lower alkyl, phenyl, haloalkyl, hydrocarbonoxy, or halohydrocarbonoxy as defined for $Q^1$;

X is an alkyl, cycloalkyl, or aromatic radical or a radical of the formula

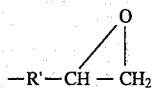

$R^1$ is a divalent aliphatic, alicyclic, heterocyclic or unsubstituted or substituted aromatic hydrocarbon radical.

7. A polymer composition made by reacting a mixture comprising:

about 5 to about 95 weight percent epoxy, phosphate, or ortho ester functionalized polyphenylene ether polymer;

about 95 to about 5 weight percent polyamide polymer; and about 0.05 to about 5 weight percent hydrogenated poly (alpha-olefin) fluid.

8. The polymer composition of claim 7 wherein the epoxy, phosphate, or ortho ester functional polyphenylene ether comprises about 15 to about 85 weight percent of the polymer.

9. A polymer composition of claim 7 wherein the polyamide is selected from the group of polymers consisting of polyamide selected from the group consisting of polyamide-6, polyamide-6, 6, polyamide 11, polyamide 12, polyamide 6,3, polyamide 6,4, polyamide 6,10, polyamide 6,12, polyamides prepared from terephthalic acid, isophthalic acid, or mixtures of terephthalic acid and isophthalic acid and trimethylhexamethylenediamine, from adipic acid and metaxylylene diamines, from adipic acid, azelaic acid, 2,2 bis(p-aminocyclohexyl)propane, and from terephthalic acid and 4,4'-diaminodicyclohexylmethane, and mixtures and copolymers of two or more of the foregoing polyamides or prepolymers thereof.

10. The polymer composition of claim 8 wherein the hydrogenated poly (alpha-olefin) has a viscosity in the range of about 2 to about 20 cSt at 100° C.

11. The polymer composition of claim 10 and further comprising an impact modifier.

12. A method for lowering the working temperature at which a functionalized polyphenylene ether composition can be molded, said method comprising forming a functionalized polyphenylene ether composition and mixing said composition with hydrogenated poly (alpha-olefin).

13. The method of claim 12 wherein the hydrogenated poly (alpha-olefin) constitutes about 0.05 to about 5 weight percent of said functionalized polyphenylene ether composition.

14. The method of claim 12 wherein said functionalized polyphenylene ether constitutes 5 to 95 weight percent of the polymeric composition being formed.

15. The method of claim 14 wherein said polyphenylene ether composition formed further comprises 95 to 5 weight percent of a polymeric material selected from the group consisting of polyamide, polycarbonates and mixtures polycarbonates and polyesters of.

16. The method of claim 12 wherein said polymeric material comprises a polyamide.

* * * * *